Patented Apr. 19, 1927.

1,625,058

UNITED STATES PATENT OFFICE.

GEORGE A. SCHROTER, OF DENVER, COLORADO.

PROCESS OF DEWATERING PEAT.

No Drawing.   Application filed July 13, 1925.   Serial No. 43,397.

This invention relates to a process of dewatering peat, an object of the invention being to reduce the peat to a commercially dry form for use as a fuel, as a fertilizer, as a board, or for any other industrial application to which it may be adapted.

Heretofore, the drying of peat has been a slow process, and it has not been commercially possible to produce a dry peat of less than twenty or thirty percent water content without the application of heat. With my improved process, water is more readily removed from the peat, and amounts of less than fifteen per cent water content are easily and commercially attainable.

Peat in its natural state is a brownish to black deposit formed by the accumulation of the slow decay of vegetable matter under water in bogs or swamps. It is often fibrous while in some varieties few fibers can be distinguished. A typical peat analysis is as follows:

| | |
|---|---|
| Carbon | 54.02 |
| Hydrogen | 5.21 |
| Oxygen | 28.18 |
| Nitrogen | 2.30 |
| Sulphur | .56 |
| Specific gravity | .85 |

I do not wish to be restricted in the use of the term "peat" to any time or state of decomposition of the plant matter, but I desire to protect broadly the use of such materials in this process of dewatering.

The typical microscopic examination of the fiber or particles shows numerous balloon formations in the cellular tissues with microscopic globules of included water.

Peat in the average well drained bog will contain from eighty-five to ninety per cent water. Attempts to remove the water content by pressure, artificial drying, osmosis, and by electricity have proven failures. It has been impossible to reduce the moisture content of the raw peat by the application of pressure either in a hydraulic or filter press below sixty per cent. All attempts by osmosis or by passing an electric current through the peat mass have failed to produce economic results.

The air drying of peat has been attempted by the Canadian Government operating on a well drained bog, by first mining and macerating the peat and spreading the same on the ground about six inches deep. With such an experiment from thirty to ninety days were required, according to the weather conditions, to reduce the moisture content in the peat from thirty to forty per cent.

A piece of ground 770 feet long, 12 feet wide and 6 inches deep will contain sixteen tons of air-dried peat. The results of such experiments by the Fuel Testing Department of the Canadian Government to date show clearly that the greater the degree of pulverizing the slower the drying, and the entire method is too expensive for competition with other material.

Peat possesses the properties of a colloid. To remove the water from it requires the removal of water from the interstices between and the surface of each particle, from such microscopic globules as exist and from the interior of the colloid, which is present with swelling. The ordinary relation of particle to particle is such that liquid cannot readily diffuse to the surface. The colloidal character of peat may render the surface somewhat impenetrable to water.

It is the purpose therefore of my invention to dewater the peat economically and give results which have never before been accomplished.

I utilize the principles of grinding, coagulation, osmosis, and compression to produce the condition for ready drying of the mass. It is my endeavor to grind the product to eliminate microscopic inclusions of water and to break down any frail structure of low diffusibility to water and to produce a closely packed, solid mass. To aid in the production of this solid mass, coagulation is used. In some measure, no doubt, the coagulating agent serves to dehyrdate the colloidal particles by reducing the swelling, and that is one example of the principle of osmosis. It may also react chemically with a constituent of the peat to produce flocculation. I find that the later addition of a material such as lime will cause further exudation of water from an apparently dry peat mud. And, finally, I utilize compression, to produce the compactness necessary to make diffusion of water from the interior of the surface and to produce a solid of good physical strength. In some cases, I add fibre to the ground peat to serve as drying capillaries.

In carrying out my improved process the peat is best put in the form of a wet slurry. In some cases, particularly in wet bogs, the peat is at a slurry point. Where the peat is drier water is added to form the slurry, and the peat is ground.

During the crushing or agitation of the peat I add a coagulating agent. For example, I use calcium hydrate in sufficient quantity to render the mass slightly alkaline. If the finely ground pulp is allowed to stand, only a small amount settles out, the balance remains in suspension and can only be filtered with great difficulty, which is impractical in a commercial way; but this finely ground peat pulp, to which has been added the coagulating agent, either in the process of grinding or to the pulp after the peat has been ground, coagulates and settles very quickly and is very easily filtered down to a moisture content of sixty or eighty per cent. The mass is then decanted or filtered by removing the excess water. The decanted or filtered mass is then dried, and before the drying process an amount of drying agent, such as burnt lime or an alkali, is added. Without such addition to the decanted or filtered mass the drying action is not so rapid.

The quickest drying method is accomplished by first applying pressure to the mass, prepared as above described. Generally speaking, the greater the pressure the more rapid is the drying action. After pressure has been applied the mass is allowed to dry by letting it stand in the open for several days.

The filtered peat is then molded or pressed and allowed to dry, and the moisture content will drop about ten per cent per day until the moisture content is below ten per cent. If the filtered peat is spread out and not molded or pressed it dries more slowly.

Experiments made by adding to filtered coagulated peat, approximately one per cent of a drying agent such as burnt lime, and also enough dried peat less #16 mesh is added so that the mixture can be molded under greater pressure, the drying is still further hastened.

It will therefore be noted that with my improved process for dewatering peat, the secret is adding to the peat a coagulating agent such as calcium hydrate, and preferably adding enough coagulating agent to make the original slurry alkaline, and then after decantation or filtration adding a drying agent such as burnt lime or an alkali.

Hence, it is to be distinctly understood that I do not wish to limit myself to the exact steps of the process nor to the proportions of the ingredients but desire to cover broadly the idea of dewatering peat by the addition thereto of a coagulating agent which may be calcium hydrate or it may be some other agent which would give the desired results.

I also desire to cover broadly the idea of adding to the decanted or filtered coagulated peat a drying agent such as burnt lime or an alkali, and I also wish to cover broadly the idea of adding an additional amount of dried peat or fibre to the mixture of filtered, coagulated peat and drying agent, so that the mass can be molded under greater pressure to hasten the drying action.

I claim:

1. The process of dewatering peat comprising coagulating wet peat in the form of a slurry with just sufficient lime to render the mass slightly alkaline, decanting the liquid from the slurry, adding a drying agent such as burnt lime to the decanted peat, compressing the decanted mass, and then drying the compressed mass in the atmosphere.

2. The process of dewatering peat comprising coagulating wet peat in the form of a slurry with just sufficient lime to render the mass slightly alkaline, decanting the liquid from the slurry, adding a quantity of dried peat or fiber, adding a drying agent such as burnt lime to the decanted peat, compressing the decanted mass, and then drying the compressed mass in the atmosphere.

GEORGE A. SCHROTER.